(12) United States Patent
Shah

(10) Patent No.: US 8,150,012 B2
(45) Date of Patent: Apr. 3, 2012

(54) METHOD AND APPARATUS FOR DERIVING THE PRESENT LOCAL TIME OF A TARGET STATION

(75) Inventor: Tushar R. Shah, Lombard, IL (US)

(73) Assignee: Alcatel Lucent, Paris (FR)

( * ) Notice: Subject to any disclaimer, the term of this patent is extended or adjusted under 35 U.S.C. 154(b) by 1300 days.

(21) Appl. No.: 11/774,953

(22) Filed: Jul. 9, 2007

(65) Prior Publication Data

US 2009/0016509 A1    Jan. 15, 2009

(51) Int. Cl.
*H04M 1/56* (2006.01)
*H04M 15/00* (2006.01)

(52) U.S. Cl. ............... 379/142.11; 379/142.17; 455/415

(58) Field of Classification Search ............... 379/88.11, 379/88.19, 88.21, 93.17, 93.23, 142.01, 142.09, 379/142.1, 142.11, 142.17, 245, 247; 455/415
See application file for complete search history.

(56) References Cited

U.S. PATENT DOCUMENTS

| | | | | |
|---|---|---|---|---|
| 5,528,558 A | * | 6/1996 | Mardhekar et al. | 368/10 |
| 5,818,920 A | * | 10/1998 | Rignell et al. | 379/211.02 |
| 5,920,824 A | * | 7/1999 | Beatty et al. | 455/425 |
| 6,075,992 A | * | 6/2000 | Moon et al. | 455/455 |
| 7,245,924 B2 | * | 7/2007 | Katagishi et al. | 455/456.1 |
| 7,881,748 B2 | * | 2/2011 | Bari et al. | 455/553.1 |
| 2002/0168987 A1 | * | 11/2002 | Wang et al. | 455/456 |
| 2006/0104428 A1 | * | 5/2006 | Jin | 379/142.01 |
| 2011/0099270 A1 | * | 4/2011 | Hartman et al. | 709/224 |

* cited by examiner

*Primary Examiner* — Binh Tieu
(74) *Attorney, Agent, or Firm* — Duft, Bornsen & Fishman, LLP

(57) ABSTRACT

A communication system that enables a requesting station to receive information for the local time of the present situs of a target station. The communication system includes a time server that receives a request for the local time of the current situs of the target station. The time server may determine the present time of the target station by querying a location server for the present situs of the target station. The time server uses the situs information to obtain the local time to of the target station based on the present situs. The time information is transmitted to the requesting station for presentation to a user.

19 Claims, 4 Drawing Sheets

METHOD AND APPARATUS FOR DERIVING THE PRESENT LOCAL TIME OF A TARGET STATION

FIELD OF THE INVENTION

This invention relates to a method and apparatus for providing an indication to a device regarding the present local time of the situs of a target station.

PROBLEM

It can be a problem that a party contemplating the establishment of a call is required to manually determine the present local time of the person (or station) with which he/she may desire to communicate. The calling party may desire this information to avoid placing a call at a time inconvenient to the called party.

It is commonplace for users to maintain a "contacts list" stored on a mobile phone or on an auxiliary device of a non-mobile station. Contact lists enable a user to store the telephone numbers of parties with whom he/she may desire to communicate. A user may know the present local time of some parties on a contact list. However, the contact list may contain the telephone numbers of parties a caller cannot remember. The caller is then required to calculate the present local time of the called parties to avoid calling them at inconvenient times.

The problem is worse for calls to foreign countries. A call to Europe from the United States may have a time differential of 5, 6, 7, or more hours. A call to Europe at 5 pm from some United States time zones may be received by a party in Europe at midnight or even the next day. A call from the United States to Australia will probably be received by the called party the next day due to a 17-hour time differential.

It can be seen that it may often be a problem for a user to avoid making calls to certain parties at times that are inconvenient to these parties.

SOLUTION

This invention solves the above and other problems in accordance with which methods and apparatus are provided to furnish information to a calling party regarding the local time of the present situs of a called party or station. The provided local time information may be visual (e.g., graphical), textual, or audible. In accordance with the present invention, this time information is provided by a time server that receives requests for time information of a target station. The time server determines the local time at the present situs of the target station, and transmits the determined time information to the calling station for display to the user.

In accordance with an exemplary embodiment of the invention, the time server may receive requests for time information from a calling station. As is well known to those skilled in the art, each contact maintained on a contact list is associated with and/or displays information for a party specified by the user. The displayed contact is user determined and may include all or part of the specified party's name, telephone number, and the local time of the present situs of the specified party. A user may control operation of his/her contact list to see a display of the present time at the situs of the specified party. The user may also initiate a call to the target party represented by an entry on the contact list and may view the displayed time of the target party. If the displayed time is inconvenient to the target party, the user at the requesting station may terminate the establishment of a call connection. The user may permit the call connection to be established if the displayed time of the target device/station is convenient.

The time server receives a request from a station in response to: a user generated request; a request to populate the contact list of a station; and/or to the initiation of a call by a requesting station.

The time server may receive requests from a contact server for time information of a target party. Those skilled in the art will know that a contact server may store contact information for use on contact lists of the phones or other communication devices. The contact server transmits requests to the time server for time information of target parties in a manner similar to that described for requests by a requesting station. In use, the contact server receives requested time information from the time server and stores the received time information which represents contact list information that may transferred to or used by a requesting station. The contact server may be operated to automatically provide updated contact list information for the user station or may be used to provide time information in response to a current user request. Similarly, the contact server may automatically and periodically transmit requests for time information to the time server.

In accordance with an exemplary embodiment of the invention, the time server may receive a request from a calling station or from a contact server. The time server may transmit a query to a location server for information specifying the present situs of a target station. This situs information is transmitted from the location server to the time server that determines the present local time of the target station. This local time information is transmitted by the time server to the requesting station for display to the user and/or for entry into the contact list of the user.

In accordance with another exemplary embodiment of the invention, let it be assumed that the target party has a phone whose present situs is determined by the location server. The request from the calling station is received by the time server that queries the location server to determine the present situs of the target station. The situs information is received by the time server that then determines the requested time information. This time information is transmitted back to the requesting station where it is made available to the calling party and/or used to update the user's contact list. Having received the time information, the user determines whether the present local time of the target station is suitable to place a call to the target station.

In accordance with another exemplary embodiment of the invention, the requesting station may be a phone equipped with logic facilities such as a memory and processor that receives a selected target station from the user's contacts list and processes this information to determine the present local time of the situs of the target station. The determined present local time is then displayed or otherwise presented to the user as above described. Alternatively, the phone can be programmed to respond to the user selection of a target party from the "favorites list" and to forward this information via network switching facilities to the time server. The time server responds by transmitting the corresponding time information via the network switching facilities to the requesting phone. The requesting party reviews this information and determines whether to place a call to the target station.

DESCRIPTION OF THE DRAWINGS

The above and other advantages and aspects of the invention may be better understood from a reading of the following detailed description thereof in conjunction with the drawings in which.

DETAILED DESCRIPTION

FIGS. 1-4 and the following description depict specific exemplary embodiments of the invention to teach those skilled in the art how to make and use the invention. For the purpose of teaching inventive principles, some conventional aspects of the invention have been simplified or omitted. Those skilled in the art will appreciate possible variations of embodiments that fall within the scope of the present invention. Those skilled in the art will also appreciate that features described below can be combined in various ways to form multiple variations of the invention. As a result, the invention is not limited to the specific embodiments described herein but only by the appended claims and their equivalents.

In order to facilitate a description of the present invention, the following specifies the terminology used herein. The term requesting station identifies a station or a device whose user desires to receive local time information of a station to which a user may place a call. A requesting station may include a phone (land line telephone, cellular phone, portable phone, PDA, Smartphone, etc.), a computer, or any other suitable device for establishing communications with another station or user of a station. A user at the requesting station is termed the requesting party. The term requesting device identifies a device such as a station or contact server that can query a time server to obtain target station time information for user created contacts. The station for which a requesting party or device desires to know the present local time is termed the target station. The user of the target station is termed the target party. The user of a station may be either a person or automated equipment. A call may be a connection between two or more stations used by humans or may be a call connection between automated facilities or any combination of human users and automated facilities. The station equipment of the present invention may be embodied in station equipment well known in the prior art. The present invention may be embodied in various types of switching or communication systems that function to establish connections between calling and called stations.

Figure 1:
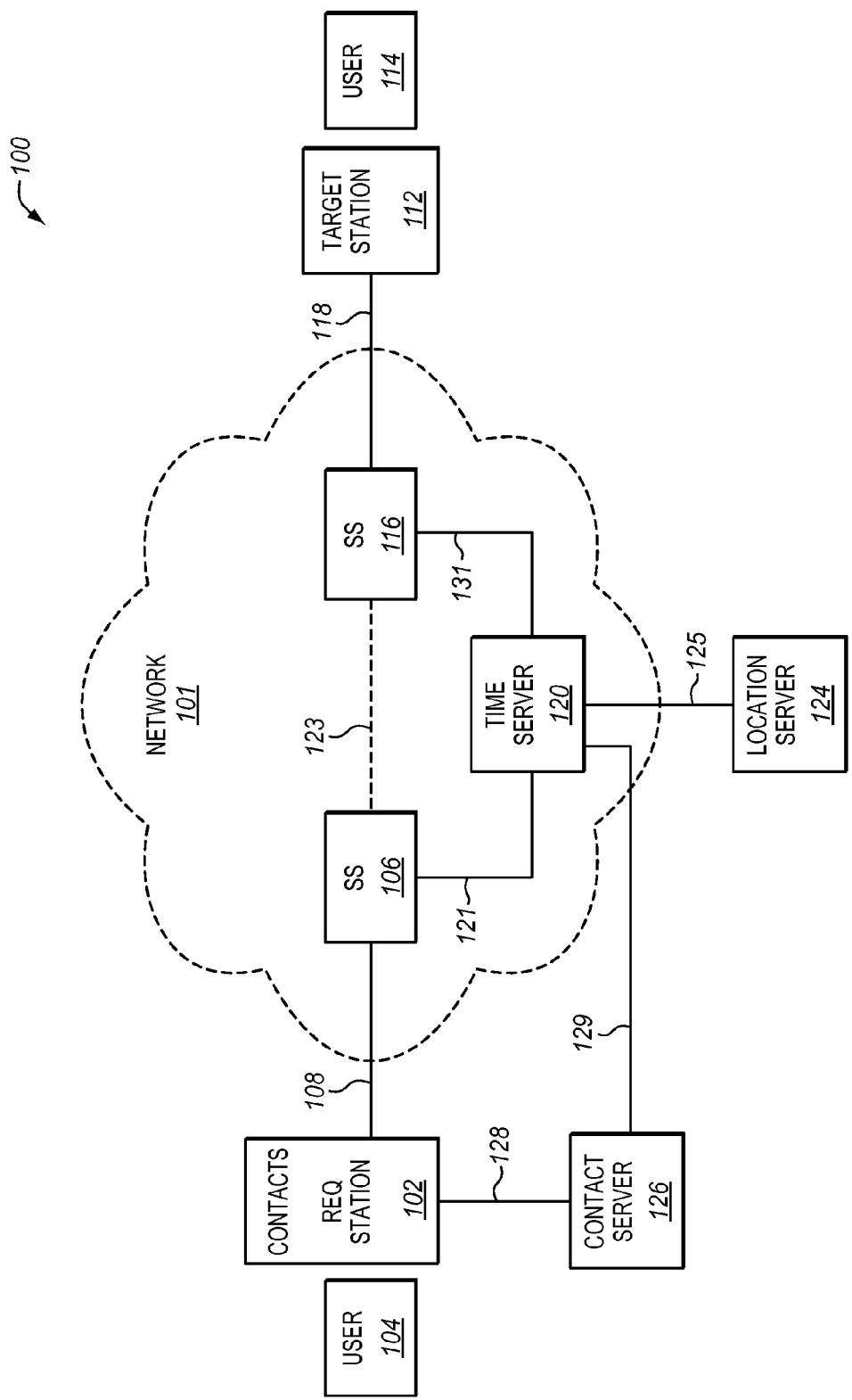
FIG. 1 discloses one possible exemplary embodiment of the invention.

FIG. 1 discloses a system 100 adapted to provide communication service to a user who desires to know the present local time of a target party before placing a call. System 100 comprises a network 101 that is connected by path 108 to requesting station 102 that serves user 104. Network 101 is also connected by path 118 to target station 112. Switching element 106 (SS) is adapted to extend call connections over path 123 between stations in a conventional manner.

Switching element 106 is connected over path 121 to time server 120. Switching element 116 (SS) is connected by path 131 to time server 120. Network 101 is ubiquitous and may be connected to other devices and additional stations. These devices are not shown on FIG. 1 to minimize drawing complexity. Suffice it to say that network 101 is adapted to establish call connections between the stations connected to or coupled to the network. Time server 120 is used as subsequently described to provide time information pertaining to a target party when such time information is requested by a user 104 at requesting station 102. Those skilled in the art will know that requesting station 102 may include a processing system that enables the stations, such as 102, 112, and 122, to receive and store data, as well as to provide for the processing of data before it is transmitted to a station user such as 104.

Requesting station 102 may initiate a request for the present local time of target station 112. System 100 enables a requesting party who is considering calling another party, but who would first like to know the present local time at the target station, to avoid placing a call at a time inconvenient to the target party. Contact server 126 may also initiate a request that the present local time of the target station 112 be provided to contact server 126. Thus, contact server 126 may be coupled to time server 120 via path 129. Contact and related local time information maintained in contact server 126 may be communicated to a requesting station 102 via path 128.

Let it be assumed that requesting station 102 outputs information over path 108 to switching element 106 at a time that user 104 is considering making a call to a target station for which he/she desires to know the present local time. Requesting station 102 activates the "contacts display" as shown on FIG. 2. This displays the parties on the users "contacts list". Assume that contact 1 displays the target party for which user 104 desires the present local time information. In accordance with the present invention, user 104 then selects contact 1 by depressing one or more keys of requesting station 102 (or by taking other appropriate action) to select contact 1. The selection of contact 1 transmits target party information over path 108 to switching system 106, which forwards the received information over path 121 to time server 120.

Figure 2:
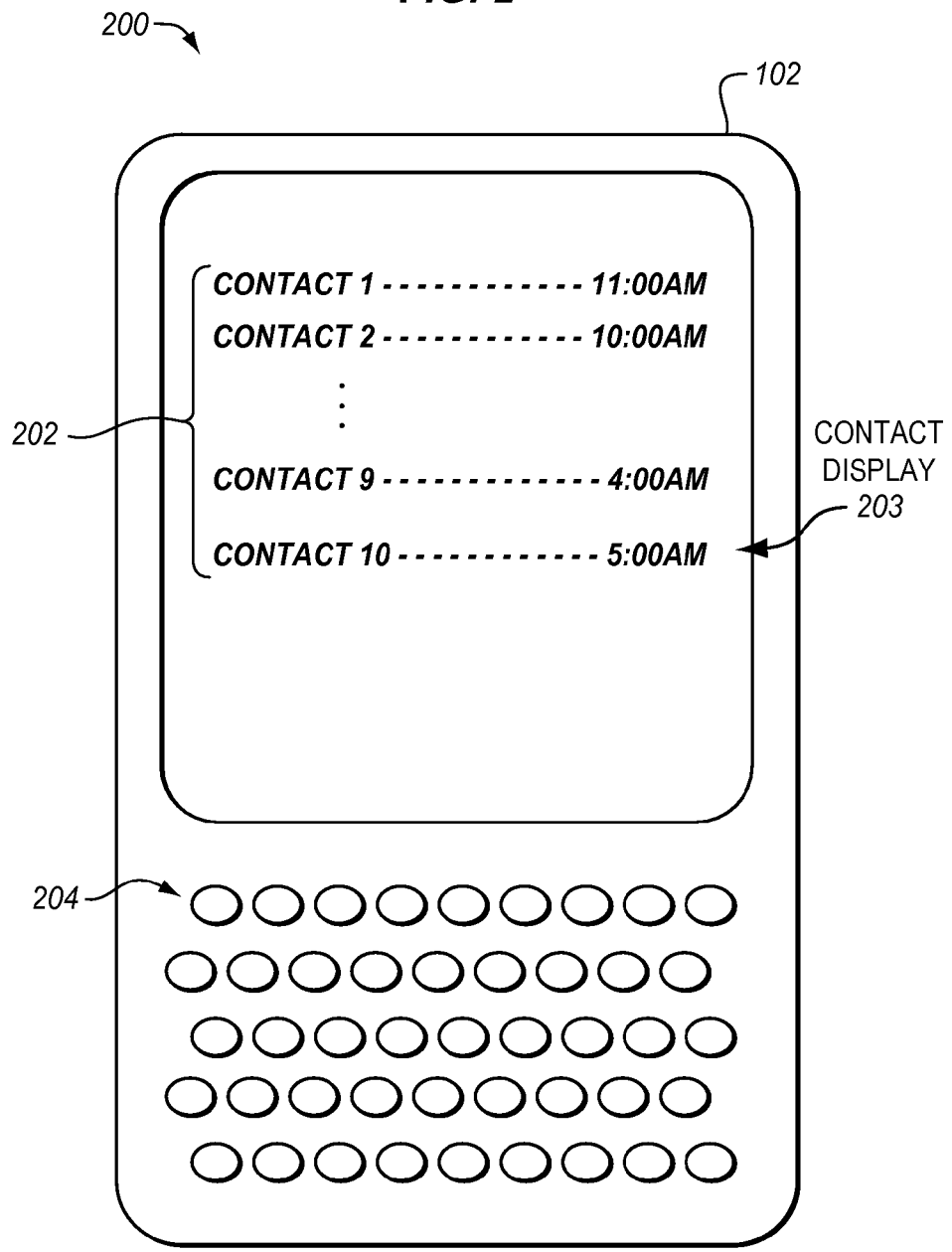
FIG. 2 discloses further details of a station device that displays information to a user.

Assume that contact 1 of FIG. 2 indicates indicia of a target station, such as target station 112. When time server 120 receives indicia for contact 1, time server 120 transmits a query to location server 124 via path 125 that determines the present situs of target station 112. The determined situs is transmitted to time server 120. Time server 120 determines time information for target station 112 based on the situs information provided by location server 124. The determined time information is transmitted by time server 120 to requesting station 102 where it is presented to user 104.

As priorly described, contact server 126 may transmit requests to time server 120. These requests may be transmitted periodically to update the contact list information stored by contact server 126. Alternatively, one or more requests for specified target stations may be transmitted by contact server 126 to time server 120. In response to the time information returned to it by time server 120, contact server 126 may update the contact information to which the returned time information pertains. The time information received by contact server 126 may subsequently be transmitted to update the contacts lists of station 102. Further, if desired, the contact information received by contact server 126 may be stored therein for use as a contact list for station 102. Time server 120 receives a request from a station in response to a user generated request, in response to a request to populate the contact list of a station such as 102, and/or in response to the initiation of a call by a requesting station.

In accordance with an alternative method of determining the present local time of the situs of the target station 112, time server 120 has a database that stores the present local time for a target station. This enables the database of time server 120 to determine the present local time for a target party. This local time information is transmitted by time server 120 via path 121 and switching element 106 over path 108 to requesting station 102. The received information is displayed by requesting station 102. Requesting party 104 reads the displayed time and determines whether the displayed time is convenient to the user identified by contact 1. User 104 then either places a call by selecting contact 1 or decides not to place a call. If user 104 decides to place the call, he/she re-selects contact 1 to establish a call connection to be established to target station 112.

Those of ordinary skill will understand that the various stations and servers shown in FIG. 1 may be more or less integrated or distributed through nodes and devices all coupled through network 101. Thus the particular topology of network components shown in FIG. 1 is intended merely as exemplary of one possible such configuration. In view of FIG. 1, numerous equivalent configurations applying well known telecommunication and data networking technologies will be recognized by those skilled in the art.

FIG. 2 discloses further details of one possible embodiment of a device 200 that displays contact information. Device 200 may be part of a phone of station 102. FIG. 2 shows a user contact list 202. Each contact may be programmed by the user to display a name or part of a name. Each contact 202 may also be controlled to display an address for the contact, and/or the associated area code and phone number. Each contact 202 contains time information in the right column. The contacts 202 of display 203 are user defined and user created. The time information in the right hand column may advantageously be obtained by transmitting a time request as priorly described to time server 120. Time server 120 determines a requested time and transmits it back to a user of device 200 for entry into its contact list 202. Keys 204 (or other suitable user input components such as speech recognition, touch screens, stylus pointer, etc.) may be used to control functions such as transmitting a request for time information to time server 120 and for controlling the establishment of communication connections.

Device 200 may store information defining its contact list 202 in an associated memory (not shown). The memory may be periodically updated by receiving time information from time server 120 or by receiving time information from contact server 126. Alternatively, device 200 may not store its contact information. Instead, it may use the contact list information in contact server 126. In this mode, contact server 126 stores the contact server information of station 102, but makes it available when needed to a user of station 102.

Contacts of station 102 are represented as contacts 202 and contact display 203 of FIG. 2. The contacts and the contact display of FIG. 2 may be physically stored in station 102 or may be stored separate from station 102 and accessed by the station.

Figure 3:
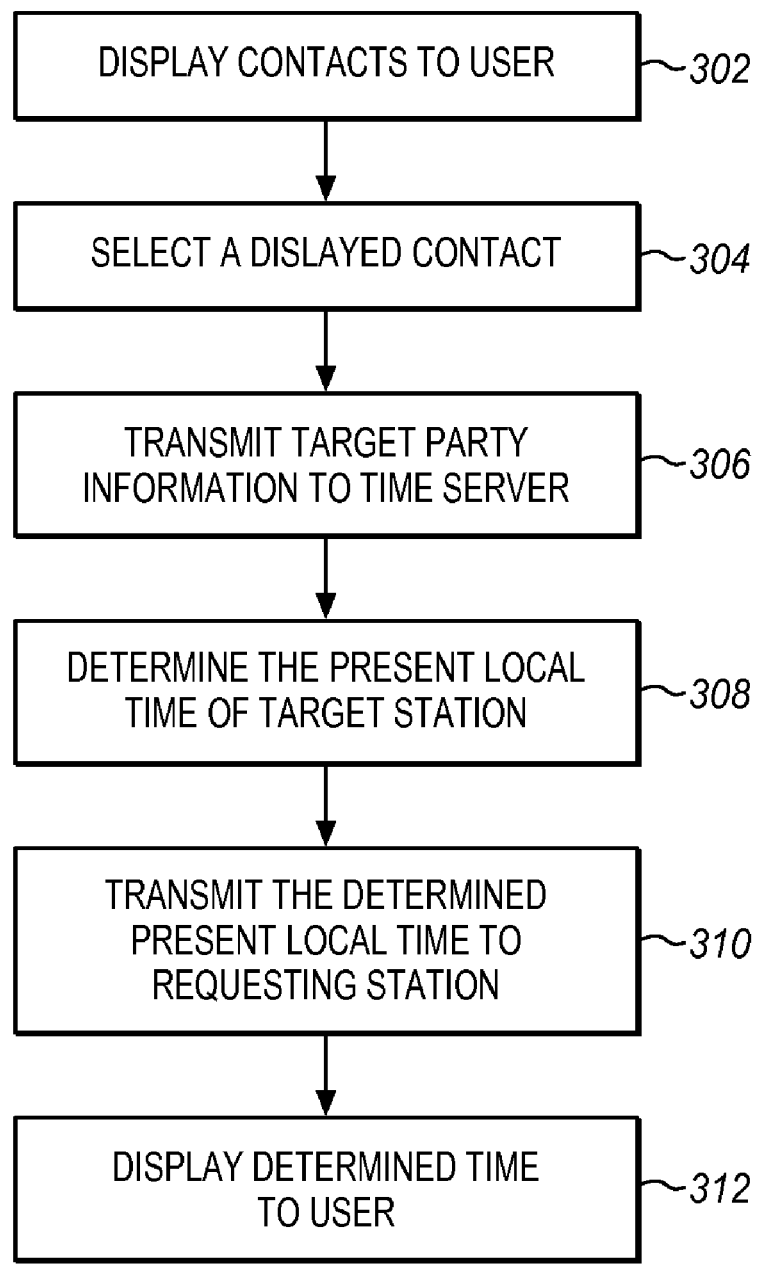
FIGS. 3 and 4 are flowcharts disclosing further information regarding the invention.

FIG. 3 illustrates a flow chart that describes the steps that serve a request for the present time of target station 122. In step 302, a user activates a display of a contacts list. Step 304 displays a selected contact of the contact list. Step 306 transmits target party information to time server 120. Step 308 determines the local time of the target station represented by the selected contact. Step 310 transmits the determined local time to the requesting station. Step 312 displays the determined time of the target station to the user.

Figure 4:
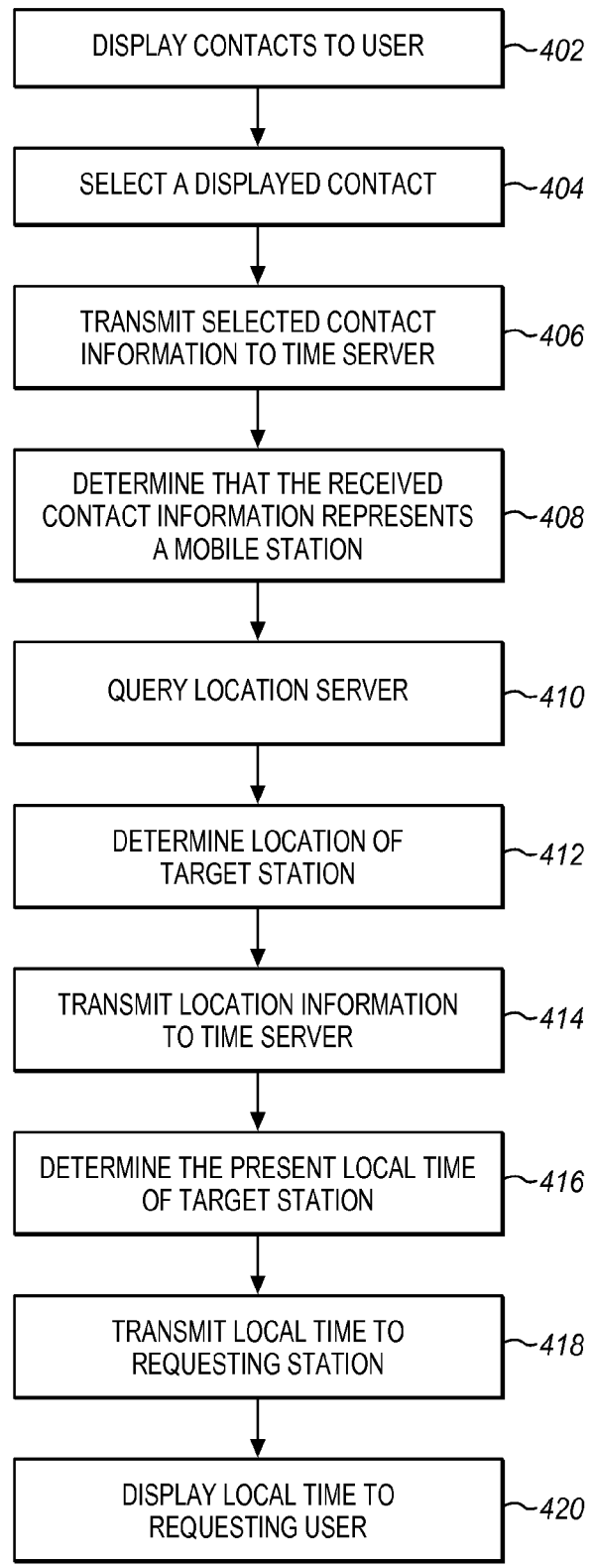

FIG. 4 is a flowchart illustrating the steps that serve a request for the local time of a mobile target station 112. Step 402 causes the contact list of the user to be displayed. In Step 404, the user selects a contact from the contact list. Step 406 transmits information for the selected contact to time server 106. Step 408 determines that the received contact information represents a mobile station. Step 410 sends a query to location server 124 to determine the present situs of the target party. Step 412 derives the location of the target station. Step 414 transmits the location information to time server 120. Step 416 determines the present local time of the target station based on the received location information. Step 418 transmits the local time information to the requesting station 102. Step 420 displays the local time to a user at the requesting station.

EPILOGUE

It is to be understood that the embodiments of the invention disclosed herein have been simplified in the specification as well as on the drawings to minimize complexity and facilitate understanding. It is to be understood that this simplification and clarification may possibly necessitate the elimination of parts and elements that might be included in a commercial embodiment of the invention. The reason for this is that the present invention has been shown as embodied in a communication network that is adapted to serve conventional connections between parties or elements served by the communication network. The communication network shown may be embodied by many possible well-known prior art systems whose details are of no relevance to an understanding of the present invention. The present invention is specifically directed to the provision of facilities that enable a communication system to present information to a user regarding the local time of the present situs of a target station. A user may be a person or automated facilities at a requesting station. The target station may be of any type well known in the art that is adapted to establish communication connections between parties or stations using any technology well known to those skilled in the art to which this invention pertains.

I claim:

1. A system that derives information regarding the local time of the present situs of each of a plurality of target stations, said system comprising:
    a time server that receives a signal including a request to populate a contact list for a requesting device;
    said time server identifies said target stations based on the contact list;
    said time server determines the local time information of the present situs of each of said target stations; and
    said time server populates the contact list by transmitting the determined local time information of each of said target stations to the requesting device.

2. The system of claim 1 wherein said signal is received from said requesting device.

3. The system of claim 1 wherein said time server transmits a query to a location server;
    situs information of each of said target stations is received by said time server from said location server;
    said time server determines the local time information of the present situs of each of said target stations based on said situs information; and
    the determined local time is transmitted by said time server to said requesting device.

4. The system of claim 1 wherein said device may be a contact server or a communication device such as a phone.

5. The system of claim 4 wherein said time server is adapted to periodically receive a user defined contact list from said contact server.

6. The system of claim 5 wherein said received contact list defines each of said target stations.

7. The system of claim 1 in which said time server receives a request from a station in response to a user generated request.

8. The system of claim 1 wherein each of said target stations is represented by an entry in the contact list.

9. The system of claim 8 wherein said time server is operable periodically to transmit time information regarding a contact of the contact list to said contact server;

said time server is further operable to periodically transmit local time information relating to the contact to a phone for storage in the contact list; and said time server is further operable to periodically transmit said local time information relating to the contact to said contact server for storage in a memory.

10. A method of operating a system that derives information regarding the local time of the present situs of each of a plurality of target stations, said method comprising:

receiving a request to populate a contact list;

identifying said target stations based on the contact list;

determining said local time of the situs of each of said target stations; and populating the contact list by transmitting said local time of each of said target stations to a device that generated said request for said information.

11. The method of claim 10 wherein said device may be a contact server or a phone.

12. The method of claim 10 further comprising:

transmitting a query regarding a target station to a location server;

receiving situs information regarding the present situs of said target station from said location server;

determining the local time of the present situs of said target station; and transmitting said local time to said device.

13. The method of claim 10 further including:

receiving user defined contact information identifying the contact list from a phone of said user or from a contact server;

periodically transmitting the local time of each contact in the contact list to said contact server or to said phone for entry in said phone.

14. A method of operating a system for deriving information regarding the local time of the present situs of each of a plurality of target stations, said method comprising:

generating at a requesting station a request to populate a contact list relating to said target stations;

transmitting said request to a time server;

receiving information at said requesting station indicating the local time of the situs of each said target station; and populating the contact list by presenting said time information to a user at said requesting station.

15. The method of claim 14 further comprising:

defining target stations represented as contacts in the contact list, the contact list stored at said requesting station;

selecting a plurality of contacts of said contact list to obtain the local time of the present situs of target stations represented by the selected contacts;

generating a display at said requesting station of the local time of said selected target stations; and presenting the local time of said selected stations to a user of said requesting station.

16. The method of claim 14 further including:

defining target stations represented as contacts in the contact list, the contact list stored at said requesting station;

storing information regarding the local time of the present situs of each target station represented as a contact in said contact list of said requesting station;

selecting a plurality of contacts of said contact list;

transmitting a contact signal to a time server that enables said requesting station to receive information regarding said local time of target stations defined by said selected contacts; and presenting said received information to a user.

17. The method of claim 14 further including:

defining target stations as contacts of the contact list, the contact list stored at said requesting station;

selecting a plurality of contacts of said contact list;

generating a request requesting information regarding said local time of a situs of each target station defined by said selected contacts;

transmitting said request to a time server that enables said requesting station to receive information regarding said local time of the present situs of said target stations defined by said selected contacts;

receiving at said requesting station time information regarding the local time of the situs of said target stations defined by said selected contacts; and presenting said time information to a user at said requesting station.

18. The method of claim 14 further including:

defining target stations as contacts of the contact list, the contact list stored at said requesting station;

selecting a plurality of contacts of said contact list, and operating said requesting station to transmit a request to a time server for receiving local time information of the present situs of said target stations defined by said selected contacts in response to a user generated request at said requesting station and/or in response to the initiation of a call by a user of said requesting station.

19. The method of claim 18 including the further steps of:

operating said requesting station to transmit a request to a time server for receiving local time information of the present situs of each of said target stations defined by said selected contacts in response to receiving a user generated request at said requesting station to populate said contact list of said requesting station.

* * * * *